(12) United States Patent
Nagata et al.

(10) Patent No.: US 8,467,004 B2
(45) Date of Patent: Jun. 18, 2013

(54) DISPLAY DEVICE

(75) Inventors: Yasunari Nagata, Yasu (JP); Takashi Shimizu, Kirishima (JP); Natsuko Yamagata, Kirishima (JP); Akinori Satou, Kirishima (JP); Takashi Minami, Kirishima (JP); Yoshio Miyazaki, Kirishima (JP)

(73) Assignee: Kyocera Corporation, Kyoto (JP)

( * ) Notice: Subject to any disclaimer, the term of this patent is extended or adjusted under 35 U.S.C. 154(b) by 304 days.

(21) Appl. No.: 12/911,163

(22) Filed: Oct. 25, 2010

(65) Prior Publication Data

US 2011/0096256 A1 Apr. 28, 2011

(30) Foreign Application Priority Data

Oct. 23, 2009 (JP) .................................. 2009-243991
Oct. 25, 2010 (JP) .................................. 2010-238673

(51) Int. Cl.
*G02F 1/1335* (2006.01)
*G06F 3/041* (2006.01)
*G06F 3/045* (2006.01)

(52) U.S. Cl.
USPC ................ 349/12; 345/173; 345/174; 349/43

(58) Field of Classification Search
USPC ................................ 349/12, 43; 345/173–174
See application file for complete search history.

(56) References Cited

U.S. PATENT DOCUMENTS

2009/0174832 A1* 7/2009 Lee .................................. 349/43

FOREIGN PATENT DOCUMENTS

JP 2008-310551 12/2008

* cited by examiner

*Primary Examiner* — Nathanael R Briggs
(74) *Attorney, Agent, or Firm* — Volpe and Koenig, P.C.

(57) ABSTRACT

According to one embodiment of the invention, a display device comprises a display region including a plurality of pixel regions and a demarcating pattern of the pixel regions. The display device further comprises a first substrate having a first main surface; a plurality of first detection electrodes formed on the first main surface; and a plurality of second detection electrodes formed on the first main surface. The display device further comprises a plurality of first connection electrodes formed on the first main surface and a plurality of second connection electrodes formed on the first connection electrodes via the demarcating pattern. Each of the first connection electrodes connects the first detection electrodes adjacent to each other; and each of the second connection electrodes connects the second detection electrodes adjacent to each other.

11 Claims, 9 Drawing Sheets

DISPLAY DEVICE

FIELD OF INVENTION

The present invention relates to a display device having a touch panel.

BACKGROUND

Conventionally, a display device having a capacitive touch panel is known (for example, see Japanese Patent Laid-Open No. 2008-310551).

There is a demand for simplifying a structure of such a display device with a touch panel. Therefore, there is a need to decrease the number of components of the display device with a touch panel.

The present invention is made in view of the above need, and an object of the present invention is to provide a display device having a less number of components.

SUMMARY

According to one embodiment of the invention, a display device comprises a display region including a plurality of pixel regions and a demarcating pattern of the pixel regions. The display device further comprises a first substrate having a first main surface; a plurality of first detection electrodes formed on the first main surface; and a plurality of second detection electrodes formed on the first main surface. The display device further comprises a plurality of first connection electrodes formed on the first main surface and a plurality of second connection electrodes formed on the first connection electrodes via the demarcating pattern. Each of the first connection electrodes connects the first detection electrodes adjacent to each other; and each of the second connection electrodes connects the second detection electrodes adjacent to each other.

BRIEF DESCRIPTION OF THE DRAWING(S)

FIG. 8A is a figure corresponding to the Q portion of FIG. 1;

FIG. 8B is a cross sectional view taken along a line VI-VI of FIG. 8A;

FIG. 9A is an enlarged plan view corresponding to the Q portion of FIG. 1;

FIG. 9B is a cross sectional view taken along a line VIII-VIII of FIG. 9A;

FIG. 10A is an enlarged plan view corresponding to the Q portion of FIG. 1;

FIG. 10B is a cross sectional view taken along a line IX-IX of FIG. 10A;

DETAILED DESCRIPTION OF THE PREFERRED EMBODIMENT(S)

First Embodiment

Figure 1:
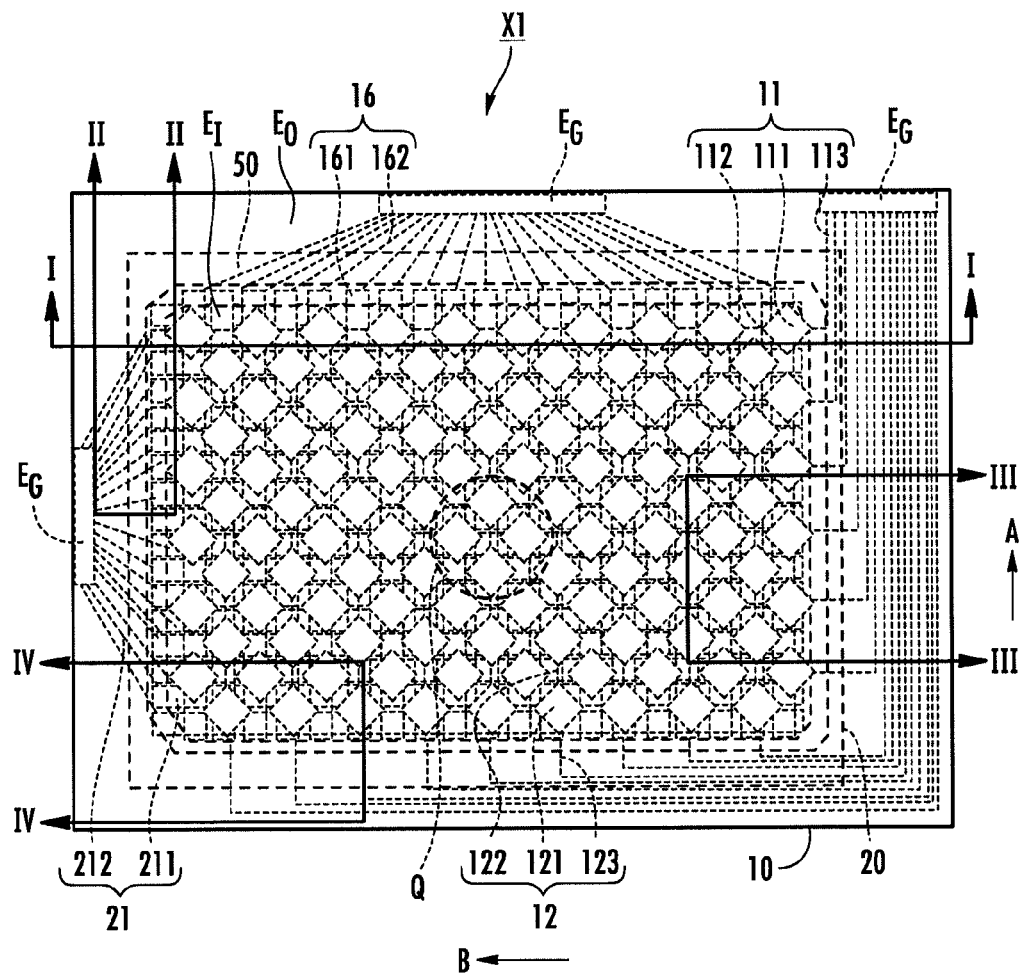
FIG. 1 is a plan view illustrating a display device according to a first embodiment of the present invention.

A display device X1 according to the first embodiment of the present invention is explained. In each figure, broken lines represent members that cannot be directly seen.

The display device X1 according to the present embodiment has an input function, and includes a liquid crystal display device and a touch panel such as a capacitive touch panel.

The liquid crystal display device includes a display region $E_I$ having a plurality of pixel regions Ps. Each of the pixel regions Ps in the display region $E_I$ is demarcated by a lattice-shaped light shielding pattern 14. Each of the pixel regions Ps is arranged with a color filter 13 of one of three colors (red, green, and blue). The pixel regions Ps of the three colors make one group to constitute a picture element region P. In this case, both of the light shielding pattern 14 and the color filters 13 are collectively referred to as a demarcating pattern.

The touch panel detects an input position with a plurality of first detection electrodes 111 and a plurality of second detection electrodes 121. In the present embodiment, first connection electrodes 112 each connecting adjacent first detection electrodes 111 and second connection electrodes 122 each connecting adjacent second detection electrodes 121 cross each other and have the light shielding pattern 14 therebetween.

Subsequently, a structure of the display device X1 is described in detail.

First, the touch panel is described.

The touch panel includes a first substrate 10, a plurality of first detection electrode patterns 11 arranged in an arrow A direction as shown in FIG. 1 within the display region $E_I$, and a plurality of second detection electrode patterns 12 arranged in an arrow B direction as shown in FIG. 1 and crossing the first detection electrode patterns 11 within the display region $E_I$.

The first substrate 10 has a function of supporting the first detection electrode patterns 11, the second detection electrode patterns 12, the color filters 13, the light shielding patterns 14, an insulating film 15 covering the color filters 13 and the light shielding patterns 14, and first display electrode patterns 16 arranged on the insulating film 15.

Figure 2:
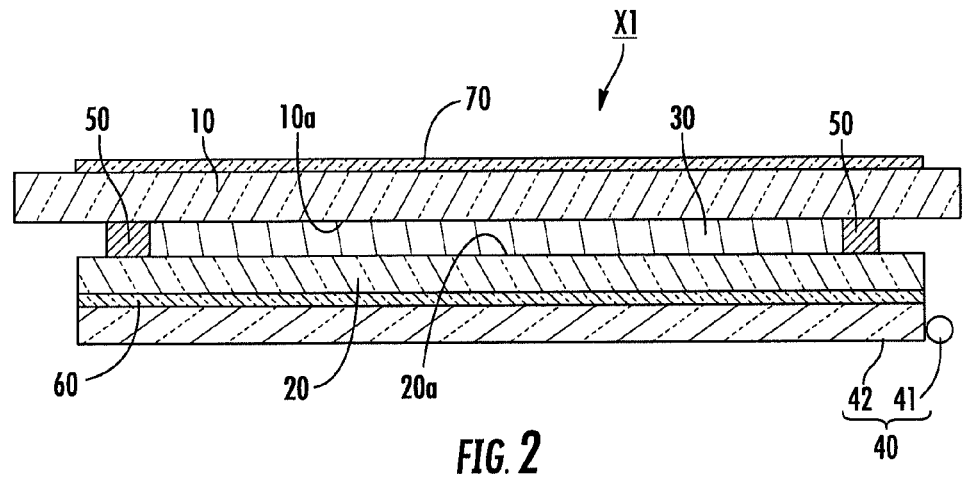
FIG. 2 is a cross sectional view taken along a line I-I of FIG. 1.
Figure 3:
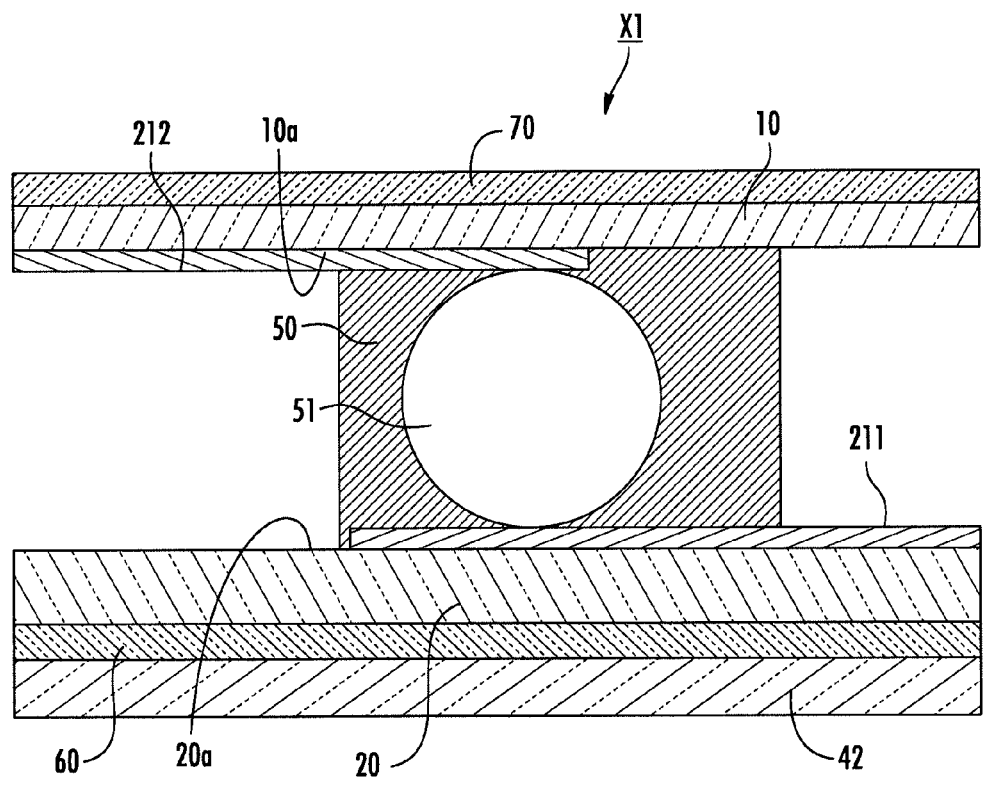
FIG. 3 is a cross sectional view taken along a line II-II of FIG. 1.

As shown in FIG. 2, the first substrate 10 has an upper surface 10a serving as a first main surface. The first substrate 10 may be rectangular in a planar shape. Exemplary materials for the first substrate 10 include a material having a translucency such as glass and plastics. The translucency means having a transparency to a visible light.

The first detection electrode patterns 11 are arranged on the upper surface 10a of the first substrate 10. The first detection electrode pattern 11 includes the plurality of first detection electrodes 111, the plurality of first connection electrodes 112 each connecting adjacent first detection electrodes 111, and a first detection conductive line 113 for applying a voltage to the first detection electrodes 111.

The first detection electrodes 111 have a function of detecting the input position in the arrow A direction. The input position is a position where input means such as a human's finger or a touch pen is in contact with the touch panel. The plurality of first detection electrodes 111 are arranged on the upper surface 10a of the first substrate 10 in the display region $E_I$. The plurality of first detection electrodes 111 are arranged in a matrix with a predetermined interval. The first detection electrodes 111 adjacent to each other in the arrow B direction are connected with each other by the first connection electrode 112. The first detection electrode 111 is formed in a substantially rhomboid shape in a plan view. However, the shape of the first detection electrode 111 is not limited to such shape. The first detection electrodes 111 may be made of a material having translucency and conductivity. Exemplary materials for the first detection electrodes 111 include ITO (Indium Tin Oxide), IZO (Indium Zinc Oxide), ATO (Antimony Tin Oxide), AZO (Al-Doped Zinc Oxide), tin oxide, zinc oxide, and conductive polymers (such as PEDOT and PSS).

Exemplary methods for forming the first detection electrodes 111 are as follows. First, a material such as ITO is deposited on the upper surface 10a of the first substrate 10 to form a film by sputtering method, evaporation method, or chemical vapor deposition (CVD) method. Then, a photosensitive resin is applied to a surface of this film, and the photosensitive resin is formed into a desired pattern by exposing and developing the photosensitive resin. Subsequently, the film made of the material such as ITO is etched using a chemical solution or the like, and the film is patterned. Thus, the plurality of first detection electrodes 111 are formed.

Figure 4:
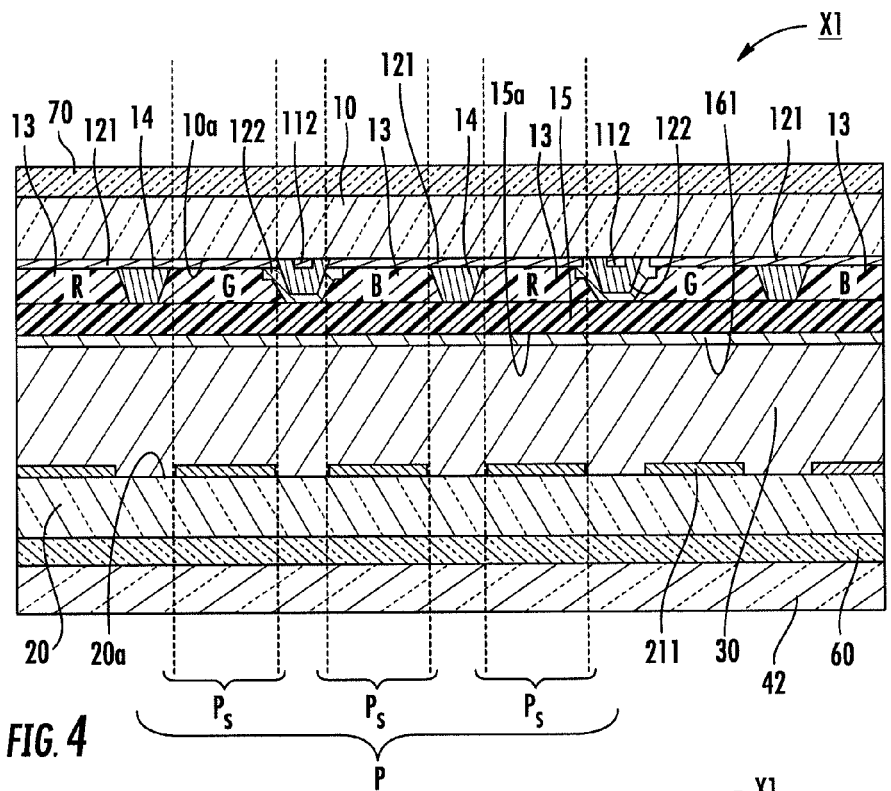
FIG. 4 is a cross sectional view taken along a line III-III of FIG. 1.
Figure 6A:
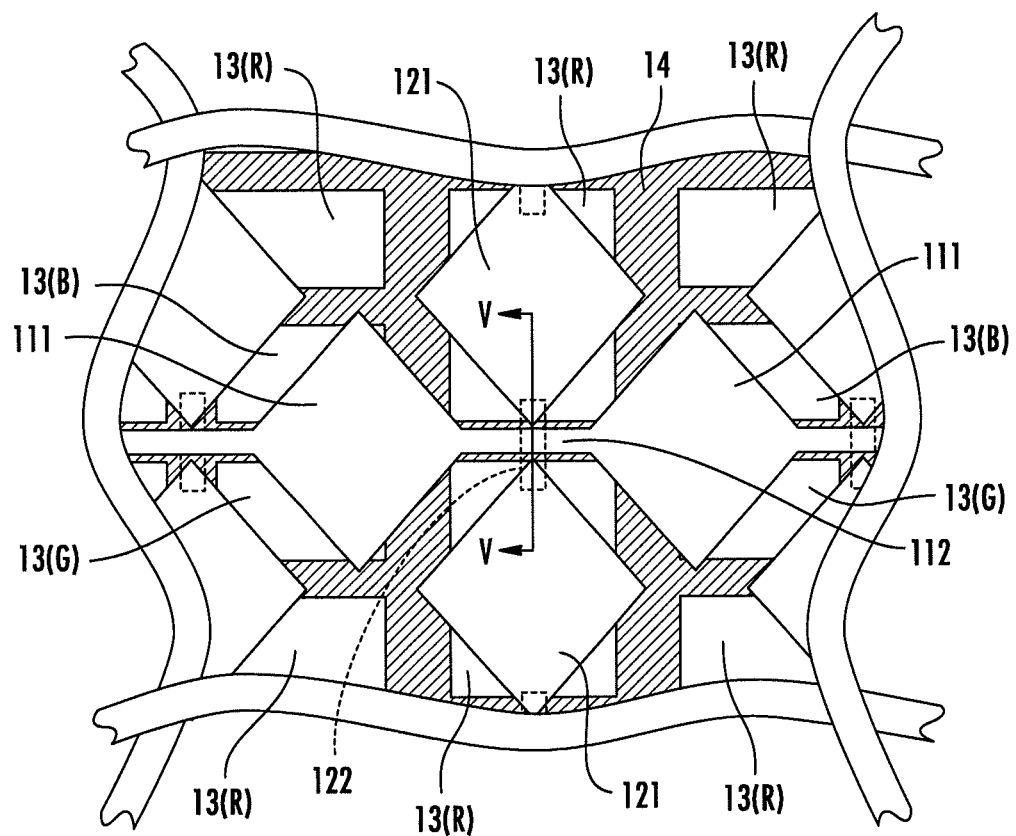
FIG. 6A is an enlarged plan view illustrating a Q portion of FIG. 1.

The first connection electrodes 112 are arranged on the upper surface 10a of the first substrate 10 in the display region $E_I$. As shown in FIGS. 4 and 6, the first connection electrodes 112 cross the second connection electrodes 122 in a plan view. At the crossing portions of the first connection electrodes 112 and the second connection electrodes 122, the light shielding patterns 14 are interposed between the first connection electrodes 112 and the second connection electrodes 122. The first connection electrodes 112 have portions facing the second connection electrodes 122. A width of the first connection electrode 112 is smaller than a width of the first detection electrode 111 or a width of the second detection electrode 121. Exemplary materials for the first connection electrodes 112 include the above-described materials for the first detection electrodes 111. Further, the method for forming the first connection electrodes 112 may be the same as the method for forming the first detection electrodes 111.

The first detection conductive lines 113 are arranged on the upper surface 10a of the first substrate 10 in an outside region $E_O$. One end portion of the first detection conductive line 113 is connected to a first detection electrode 111 located at an end of the plurality of first detection electrodes 111 arranged in the arrow B direction, and the other end portion of the first detection conductive line 113 is positioned in an external conductive region $E_G$. The first detection conductive lines 113 may be made of a conductive material such as ITO, tin oxide, aluminum, aluminum alloy, silver film, and/or silver alloy. The method for forming the first detection conductive line 113 may be the same as the method for forming the first detection electrodes 111.

The second detection electrode patterns 12 are arranged on the upper surface 10a of the first substrate 10. The second detection electrode pattern 12 includes a plurality of second detection electrodes 121, second connection electrodes 122 each connecting adjacent second detection electrodes 121, and a second detection conductive line 123 for applying a voltage to the second detection electrodes 121.

The second detection electrodes 121 have a function of detecting the input position in the arrow B direction. The plurality of second detection electrodes 121 are arranged on the upper surface 10a of the first substrate 10 in the display region $E_I$. The plurality of second detection electrodes 121 are arranged in a matrix with a predetermined interval. The second detection electrodes 121 adjacent to each other in the arrow A direction are connected with each other by the second connection electrode 122. Exemplary materials of the second detection electrodes 121 include the above-described materials for the first detection electrodes 111. Further, the method for forming the second detection electrodes 121 may be the same as the method for forming the first detection electrodes 111.

The second connection electrodes 122 are arranged on an upper surface of the light shielding pattern 14 in such a manner that the light shielding pattern 14 is sandwiched between the second connection electrodes 122 and the first connection electrodes 112. As shown in FIGS. 4 and 6, the second connection electrodes 122 cross the first connection electrodes 112 in a plan view. At the crossing portions of the second connection electrodes 122 and the first connection electrodes 112, the light shielding patterns 14 are interposed between the first connection electrodes 112 and the second connection electrodes 122, and the second connection electrodes 122 have portions facing the first connection electrodes 121. Since the light shielding pattern 14 has an extremely low transmittance of visible light, the crossing portions of the first connection electrodes 112 and the second connection electrodes 122 are less likely to be recognized. Therefore, it is possible to reduce the deterioration in display quality. A width of the second connection electrode 122 is smaller than a width of the first detection electrode 111 or a width of the second detection electrode 121. Exemplary materials for the second connection electrode 122 include the above-described materials for the first detection electrodes 111. Each of the second connection electrodes 122 may includes conductive layers as shown in FIG. 7. Further, the method for forming the second connection electrodes 122 may be the same as the method for forming the first detection electrodes 111.

Figure 6B:
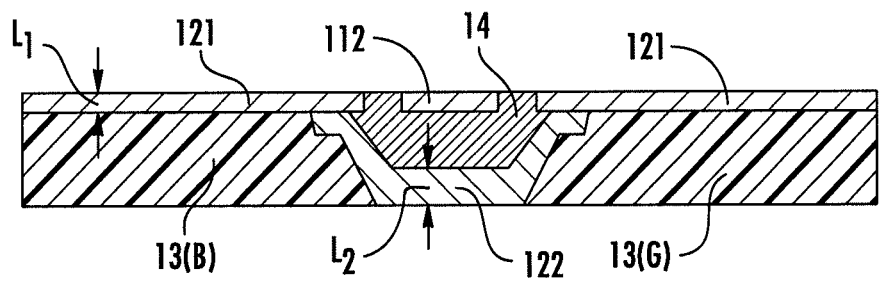
FIG. 6B is a cross sectional view taken along a line V-V of FIG. 6A.
Figure 7:
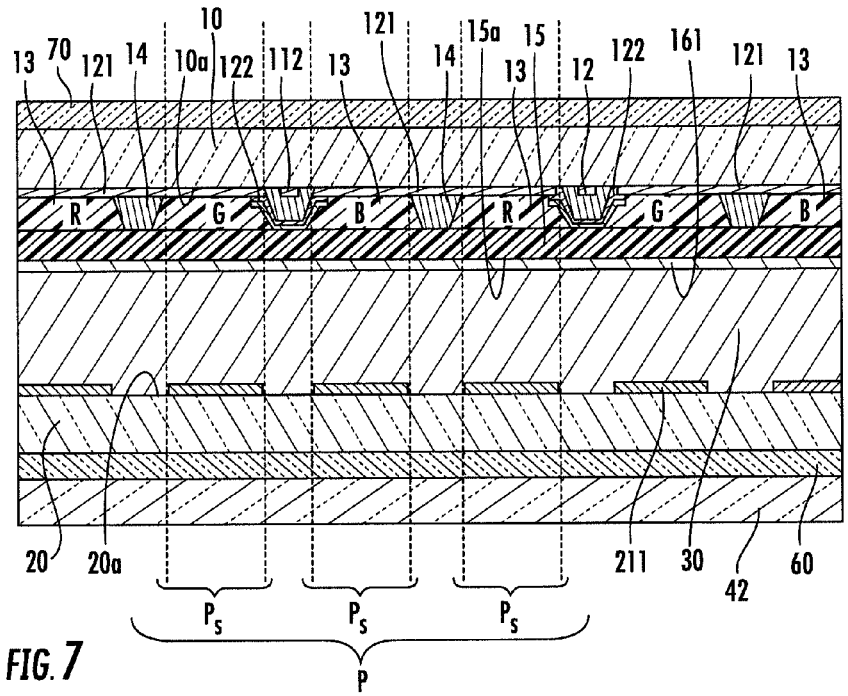
FIG. 7 illustrates a modification of the display device shown in FIG. 1, and is a figure corresponding to a cross section taken along the line III-III of FIG. 1.

As shown in FIG. 6B, a thickness $L_2$ of the second connection electrode 122 is set to be larger than thickness $L_1$ of the second detection electrode 121. Accordingly, a sheet resistance value of the second connection electrode 122 becomes smaller than a sheet resistance value of the second detection electrode 121. In other words, an electric current more easily flows through the second connection electrode 122 than through the second detection electrode 121, which improves the transmission rate of a detection signal transmitted between the second detection electrodes 121. Therefore, the detection speed of an input position is greatly improved.

Instead of making the thickness $L_2$ of the second connection electrode 122 different from the thickness $L_1$ of the second detection electrode 121, the second connection electrodes 122 may be made of a material having a low resistivity than a resistivity of the material of the second detection electrodes 121, so that a sheet resistance value of the second connection electrode 122 may be reduced. Exemplary materials having low resistivities include aluminum, chrome, gold, silver, copper, and/or alloy thereof. It should be noted that the sheet resistance value may be measured by four-point probe method.

The second detection conductive lines 123 are arranged on the upper surface 10a of the first substrate 10 in the outside region $E_O$. One end portion of the second detection conductive line 123 is connected to a second detection electrode 121 located at an end of the second detection electrode 121, and the other end portion of the first detection conductive line 123 is arranged in the external conductive region $E_G$. Exemplary materials for the second detection conductive lines 123 include the above-described materials for the first detection conductive lines 113. Further, the method for forming the second detection conductive lines 123 may be the same as the method for forming the first detection electrodes 111.

A principle for detecting the input position on the touch panel is described.

In the touch panel, since the first detection electrodes 111 are located close to the second detection electrodes 121, floating capacitances between each of the first detection electrodes 111 and each of the second detection electrodes 121 are generated. In other words, the touch panel includes a plurality of floating capacitors which are aligned in a matrix in the display region $E_I$. Therefore, when a first voltage is applied to the first detection patterns 11 and a second voltage different from the first voltage is applied to the second detection patterns 12, electric charges are generated at each of floating capacitors. In this condition, when input means such as a human's finger is in contact with the display region $E_I$ in the touch panel, floating capacitance(s) of the floating capacitor(s) existing at the contact portion of the touch panel with the input means is varied. Thus, the electric charge(s) in the floating capacitor(s) at the contact portion is also varied. As a result, voltages of the first detection pattern 11 and the second detection pattern 12 which the first detection electrode(s) 111 and the second detection electrode(s) 121 at the contact portion belongs to are changed. The change of voltages of the first detection pattern 11 and the second detection pattern 12 are read by a driver (not shown in Figs). If the change of voltages read by the driver is beyond a predetermined value, the driver identifies the first detection pattern 11 and the second detection pattern 12 in which the change of voltages is beyond the predetermined value, and then detects the crossing portion of the identified first detection pattern 11 and the second detection pattern 12 as the input position. Thus, the touch panel can detect the input position.

Subsequently, the liquid crystal display device is described in detail. The liquid crystal display device includes color filters 13 allowing passage of only a light having a particular wave length among visible lights, the light shielding pattern 14 for shielding lights, the insulating film 15 covering the color filters 13 and the light shielding pattern 14, first display electrode patterns 16 arranged on the insulating film 15, a second substrate 20 arranged to face the first substrate 10, the first display electrode patterns 16 arranged on the second substrate 20, a liquid crystal layer 30 arranged between the first substrate 10 and the second substrate 20 and located in the display region $E_I$, a light source device 40 for emitting a light onto the liquid crystal layer 30, a joint member 50 arranged between the first substrate 10 and the second substrate 20 so as to enclose the liquid crystal layer 30, a first polarization plate 60 arranged on the side opposite to the second substrate 20 with respect to the first substrate 10, and a second polarization plate 70 arranged between the light source device 40 and the second substrate 20.

The plurality of color filters 13 are arranged on the upper surfaces of the first detection electrodes 111 and the upper surfaces of the second detection electrodes 121. As shown in FIGS. 4 and 6, peripheries of the color filters 13 demarcate the pixel regions Ps. Each of the plurality of color filters 13 has any one of colors, i.e., red (R), green (G), and blue (B). The color filter 13 is located in a region in which a first display electrode 161 and a second display electrode 211 face each other. An exemplary material for the color filters is an acrylic resin added with a dye or a pigment. An exemplary method for producing the color filters 13 include applying the above-mentioned material to the upper surfaces of the first detection electrodes 111 and the second detection electrodes 121 and exposing and developing the material.

The light shielding patterns 14 are arranged on the upper surfaces of the first detection electrodes 111 and the second detection electrodes 121. As shown in FIGS. 4 and 6, the light shielding pattern 14 demarcates the pixel regions Ps, and is arranged on the upper surfaces of the first detection electrodes 111 and the second detection electrodes 121. The light shielding pattern 14 improves a contrast of the display region $E_I$ by shielding the light emitted by the light source device 40, thus improving display quality. Exemplary materials of the light shielding pattern 14 include insulating materials such as a resin added with carbon and a dye or a pigment of a color having a high light-shielding rate (for example, black).

The light shielding pattern 14 has a higher visible light-shielding rate than a visible light-shielding rate of the color filters 13 and the second connection electrodes 122. Whether the light shielding pattern 14 has a higher visible light-shielding rate than the color filters 13 and the second connection electrodes 122 is judged by the following method.

First, the visible light from the same light source is transmitted to the light shielding pattern 14 and the color filter 13 (or the second connection electrode 122) separately, and then transmission spectra of transmitted light through the light shielding pattern 14 and the color filter 13 (or the second connection electrode 122) are plotted. Next, the areas of the transmission spectra in a range of 0.38 µm-0.78 µm wavelength which is the range of visible light are calculated. If the area of the transmission spectra of the light shielding pattern 14 is larger than that of the color filter 13, it is judged that the light shielding pattern has a higher visible light-shielding rate than the color filter 13 (or the second connection electrode 122).

The light shielding pattern 14 is arranged to cover the first connection electrodes 112. The second connection electrodes 122 are arranged on the upper surface of the light shielding pattern 14. In other words, the light shielding pattern 14 electrically insulates the first connection electrodes 112 and the second connection electrodes 122.

As shown in FIGS. 4 and 6, the display regions $E_I$ are demarcated by the lattice-shaped light shielding pattern 14. Each of the regions demarcated by the light shielding pattern 14 is arranged with the color filter 13 having one of three colors, i.e., red, green, and blue, and constitutes the pixel region Ps. Pixel region Ps of the three colors, i.e., red, green, and blue, constitutes a picture element region P.

The insulating film 15 has a function of electrically insulating the second connection electrodes 122 and the first display electrodes 161. The insulating film 15 is arranged on the upper surfaces of the second connection electrodes 122. The method for forming the insulating film 15 may be the same as the method for forming the color filters 13.

The first display electrode pattern 16 includes the first display electrode 161 for applying a voltage to the liquid crystal layer 30 and a first display conductive line 162 connected to the first display electrode 161.

The plurality of first display electrodes 161 are arranged on an upper surface 15a of the insulating film 15 in the display region. In the present embodiment, the shapes of the first display electrodes 161 are in a stripe form. The plurality of first display electrodes 161 are arranged in the arrow B direction. The first display electrodes 161 may be made of a material having translucency and conductivity, such as ITO (Indium Tin Oxide) and tin oxide. The method for forming the second display electrodes 211 may be the same as the method for forming the first detection electrodes 111.

The first display conductive lines 162 are arranged on the upper surface 10a of the first substrate 10 in the outside region $E_O$. One end portion of the first display conductive line 162 is connected to the first display electrode 161, and the other end portion of the first display conductive line 162 is positioned in the external conductive region $E_G$. The first display conductive lines 162 may be made of a metal such as ITO, tin oxide, aluminum, aluminum alloy, silver, or silver alloy. The method for forming the first display conductive line 162 may be the same as the method for forming the first detection electrodes 111.

The second substrate 20 has a function of supporting the second display electrode patterns 21. As shown in FIG. 2, the second substrate 20 has a facing surface 20a disposed to face the upper surface 10a of the first substrate 10. For example, the second substrate 20 may be rectangular in a planar shape. For example, the second substrate 20 may be made of a translucent material such as glass and plastics.

The second display electrode pattern 21 includes the second display electrode 211 for applying a voltage to the liquid crystal layer 30 and a second display conductive line 212 connected to the second display electrode 211.

The second display electrode 211 has a function of applying a voltage to the liquid crystal or the like. The plurality of first display electrodes 211 are arranged on the facing surface 20a of the second substrate 20 in the display region $E_I$. In the present embodiment, the second display electrodes 211 are in a stripe form. The plurality of second display electrodes 211 are arranged in the arrow A direction in which the second display electrodes 211 cross an arrangement direction of the first display electrodes 161. Exemplary materials of the second display electrodes 211 include the above-described materials for the first display electrodes 161.

Figure 5:
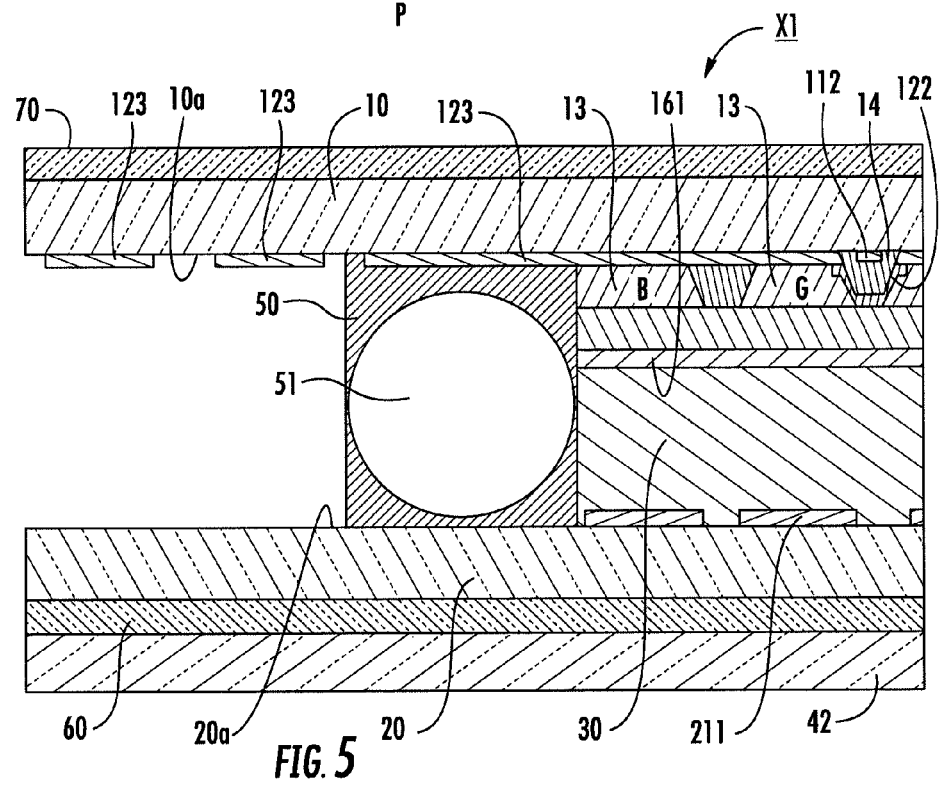
FIG. 5 is a cross sectional view taken along a line IV-IV of FIG. 1.

The second display conductive lines 212 are arranged on the upper surface 10a of the first substrate 10 in the outside region $E_O$. One end portion of the second display conductive line 212 is electrically connected to the second display electrode 211, and the other end portion of the second display conductive line 212 is positioned in the external conductive region $E_G$. In the present embodiment, as shown in FIG. 5, one end portion of the second display conductive line 212 is electrically connected to the second display electrode 211 via conductive particles 51 included in the joint member 50. Exemplary materials of the second display conductive lines 212 include the above-described materials for the first display conductive lines. Alternatively, the second display conductive lines 212 may be laminated bodies including the above-described materials. The method for forming the second display conductive lines 212 may be the same as the method for forming the first detection electrodes 111.

The liquid crystal layer 30 exhibits anisotropic property in terms of electric, optical, mechanical, or magnetic properties, and is a layer including liquid crystal which has not only regularity of a solid body but also fluidity of a liquid. The liquid crystal layer 30 is arranged between the first substrate 10 and the second substrate 20. Exemplary liquid crystals include nematic liquid crystal, cholesteric liquid crystal, and smectic liquid crystal. In the liquid crystal layer 30, a spacer (not shown) constituted by, for example, many particle-shaped members may be interposed in order to maintain a constant thickness of the liquid crystal layer 30.

The light source device 40 has a function of emitting a light onto the first substrate 10 and the second substrate 20 in the display region $E_I$. The light source device 40 has a light source 41 and a light guiding plate 42.

The joint member 50 has a function of attaching the second substrate 20 and the first substrate 10 to each other. The joint member 50 is arranged between the first substrate 10 and the second substrate 20 so as to enclose the display region $E_I$. At least the surface of the joint member 50 includes the conductive particles 51 having metals such as gold, silver, and nickel.

The first polarization plate 60 has a function of selectively allowing passage of a light in a predetermined vibrating direction. The first polarization plate 60 is positioned between the second substrate 20 and the light guiding plate 42. In FIG. 1, the first polarization plate 60 is omitted.

The second polarization plate 70 has a function of selectively allowing passage of a light in a predetermined vibrating direction. The second polarization plate 70 allows passage of the light in the vibrating direction perpendicular to the vibrating direction passed by the first polarization plate 60. The second polarization plate 70 is arranged to face the first polarization plate 60 via the first substrate 10 and the second substrate 20. In FIG. 1, the second polarization plate 70 is omitted.

A principle for displaying an image on the liquid crystal display device is described.

In the liquid crystal display device, an external liquid crystal drive circuit controls an orientation of the liquid crystal layer 30 for each of the pixel region Ps to control the light emitted by the light source device 40 to the first substrate 10, thus displaying an image in a display region $E_I$.

In the aforementioned display device X1, the light shielding pattern 14 is arranged on the upper surface 10a of the first substrate 10 so as to demarcate the display region $E_I$. Further, the second connection electrodes 122 each electrically connecting adjacent second detection electrodes 121 are arranged on the light shielding pattern 14. In other words, the light shielding pattern 14 serves not only as a member for improving the contrast in the display region $E_I$ but also as a member for electrically insulating the first connection electrodes 112 and the second connection electrodes 122. Therefore, the number of components in the display device X1 can be reduced.

In the display device X1, the second connection electrodes 122, the first detection conductive lines 113, the second detection conductive lines 123, the first display conductive lines 162, and the second display conductive lines 212 are preferably made of the same material. Therefore, a film forming step and a patterning step for forming the second connection electrodes 122, the first detection conductive lines 113, the second detection conductive lines 123, the first display conductive lines 162, and the second display conductive lines 212 can be performed at the same time, which simplifies the step for manufacturing the display device X1.

A modification of the present embodiment is hereinafter described with reference to FIGS. 8A, 8B, 9A and 9B.

Figure 8A:
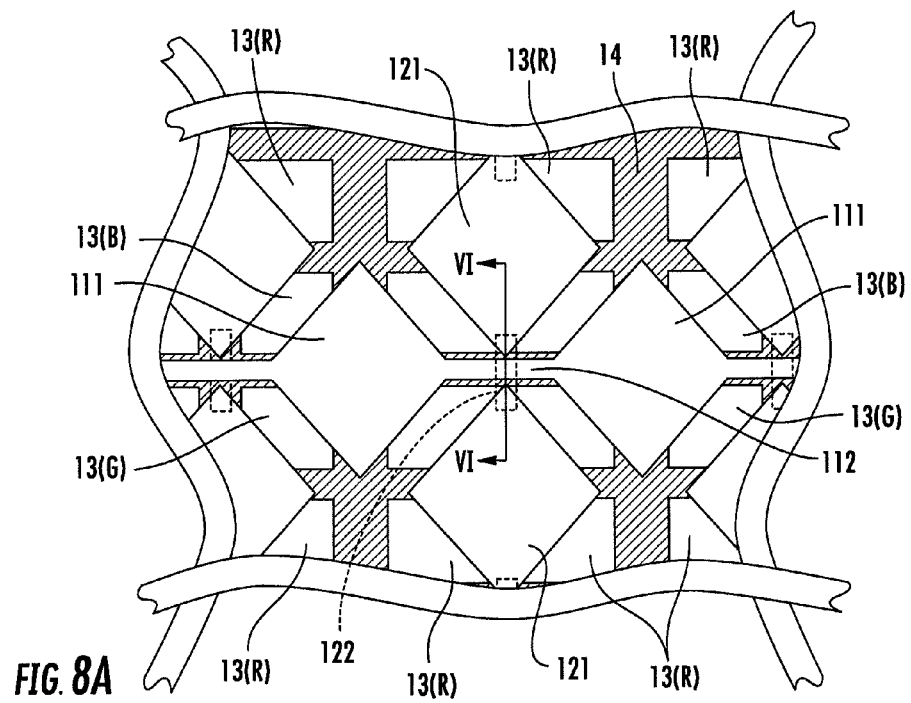
FIGS. 8A and 8B illustrate a modification of the display device shown in FIG. 1.
Figure 8B:
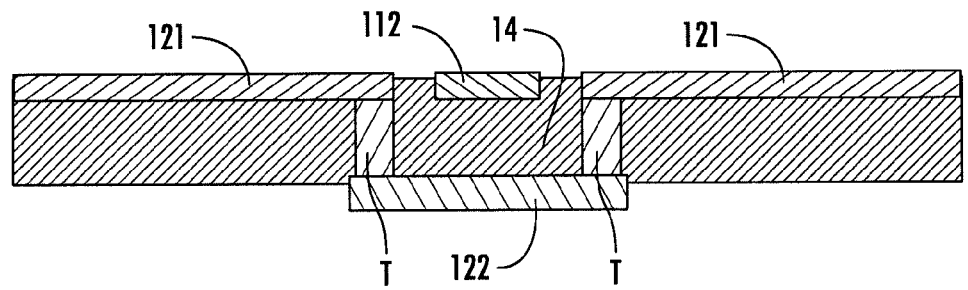

FIGS. 8A and 8B illustrate a display device X1 according to the first modification of the present embodiment. The display device X1 according to the first modification is different from the display device X1 of FIG. 1 as follows. In the display device X1 of FIG. 1, the second detection electrodes 121 are directly connected to the second connection electrodes 122. In contrast, in the display device X1 of FIG. 8B, the second detection electrodes 121 are connected to the second connection electrodes 122 via a conductive throughhole T. Therefore, in the display device X1 of FIGS. 8A and 8B, the second connection electrodes 122 can be connected to the second detection electrodes 121 regardless of where the second connection electrodes 122 are located on the light shielding pattern 14. The conductive throughhole T can be formed by arranging a throughhole on the light shielding pattern 14 and providing a conductive material such as a metal at least on an inner wall surface of this throughhole.

Figure 9A:
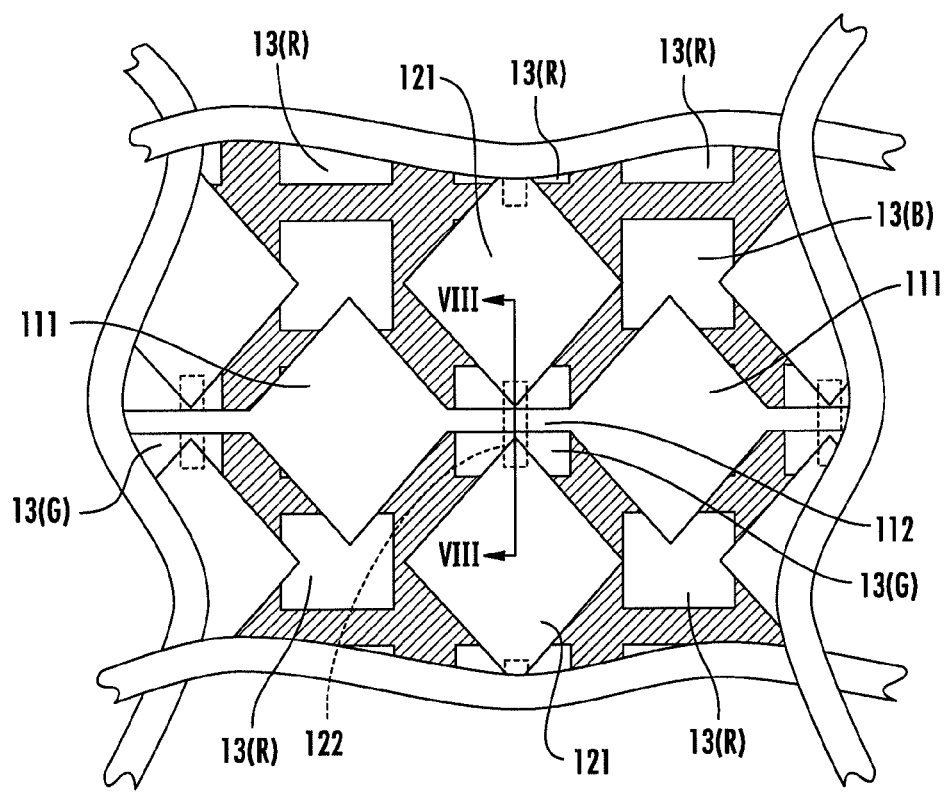
FIGS. 9A and 9B illustrate a modification of the display device shown in FIG. 1.
Figure 9B:
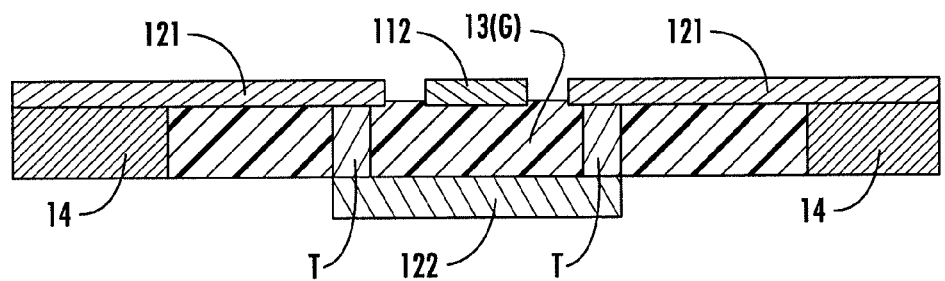

FIGS. 9A and 9B illustrate a display device X1 according to a second modification of the present embodiment. The display device X1 according to the second modification is different from the display device X1 of FIG. 1 as follows. In the display device X1 of FIG. 1, at the crossing portions of the second connection electrodes 122 and the first connection electrodes 112, the light shielding patterns 14 serving as a demarcating pattern are interposed between the first connection electrodes 112 and the second connection electrodes 122. In contrast, the display device X1 of FIGS. 9A and 9B, at the crossing portions of the second connection electrodes 122 and the first connection electrodes 112, the color filters 13 serving as a demarcating pattern are interposed between the first connection electrodes 112 and the second connection electrodes 122. It should be noted that, in the display device X1 of FIGS. 9A and 9B, the second connection electrodes 122 are connected to the second detection electrodes 121 via the conductive throughhole T. Alternatively, at the crossing portions of the second connection electrodes 122 and the first connection electrodes 112, both of the color filters 13 and the light shielding pattern 14 may be interposed therebetween.

Figure 10A:
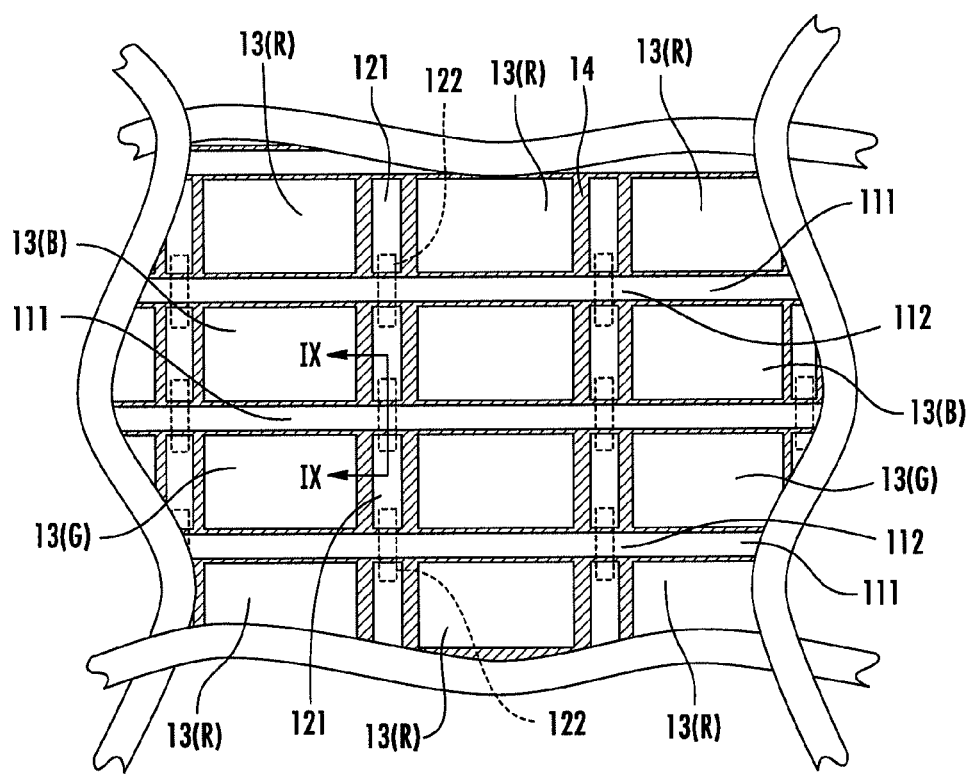
FIGS. 10A and 10B illustrate a modification of the display device shown in FIG. 1.
Figure 10B:
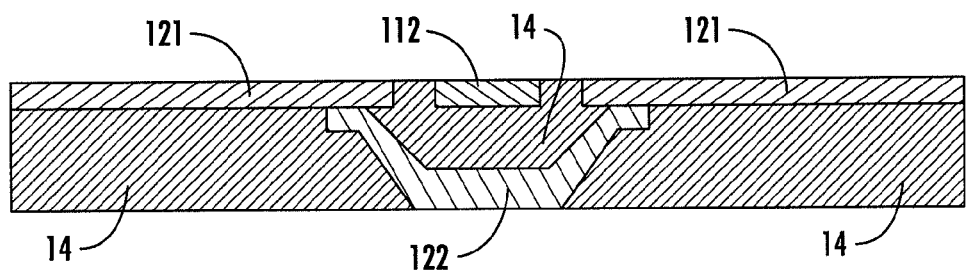

FIGS. 10A and 10B illustrate a display device X1 according to a third modification of the present embodiment. The display device X1 according to the third modification is different from the display device X1 of FIG. 1 as follows. In the display device X1 of FIG. 1, the first detection electrodes 111, the first connection electrodes 112, the second detection electrodes 121, and the second connection electrodes 122 are arranged inside and outside the light shielding pattern 14 in a plan view. In contrast, in the display device X1 of FIG. 10A, the first detection electrodes 111, the first connection electrodes 112, the second detection electrodes 121, and the second connection electrodes 122 are arranged inside the light shielding pattern 14 in a plan view, such that peripheries of the first detection electrodes 111, the first connection electrodes 112, the second detection electrodes 121 and the second connection electrodes 122 are located inside of peripheries of the light shielding pattern 14 in a plan view.

Accordingly, in the display device X1 of FIGS. 10A and 10B, a light emitted by the light source device 40 is shielded by the light shielding pattern 14. Therefore, a light having passed through the first detection electrodes 111, the first connection electrodes 112, the second detection electrodes 121, and the second connection electrodes 122 is less likely to reach a user. As a result, the first detection electrodes 111, the first connection electrodes 112, the second detection electrodes 121, and the second connection electrodes 122 are less likely to be recognized, which improves display quality.

Second Embodiment

Figure 11:
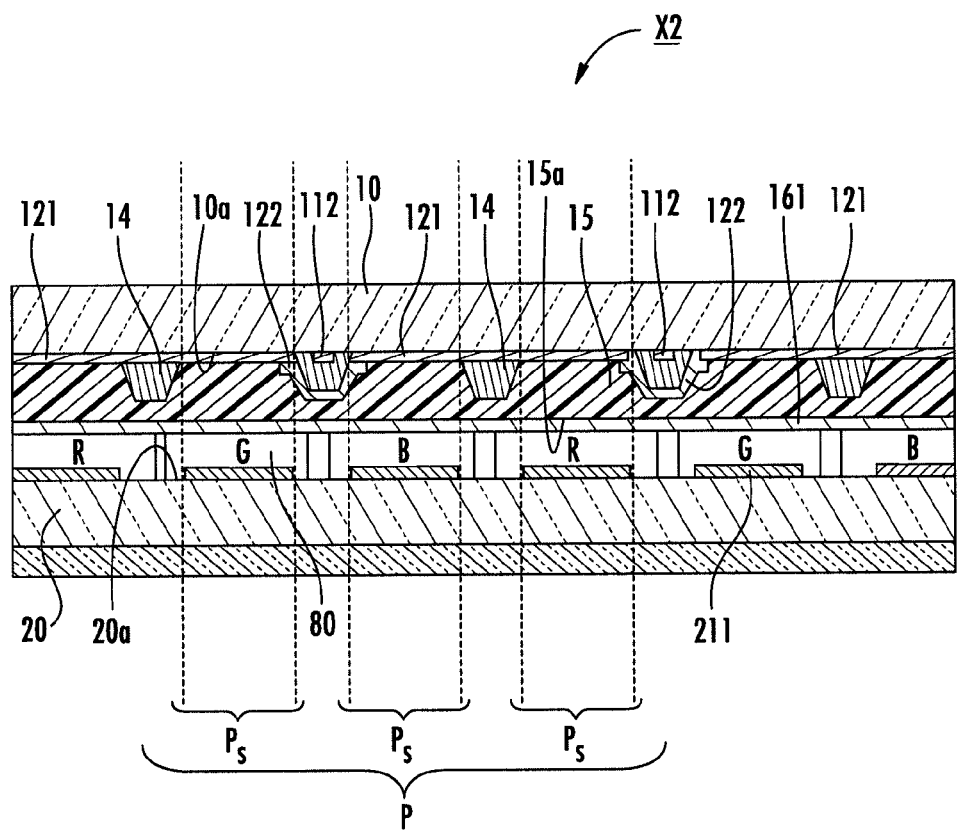
FIG. 11 is a cross sectional view illustrating an essential portion of a display device according to a second embodiment of the present invention.

Subsequently, a display device X2 according to the second embodiment of the present invention is described with reference to FIG. 11. Elements having the same functions as those of the display device X1 are denoted with the same reference numerals, and the same explanations as the explanations about the display device X1 are basically omitted.

The display device X2 is different from the display device X1 as follows. In the display device X1, a liquid crystal display panel is employed. In contrast, in the display device X2, an EL display panel is employed.

The EL display panel has a plurality of light emission layers 80 instead of the color filters 13 and the liquid crystal layer 30 of the liquid crystal display panel. The light emission layers 80 are arranged in respective pixel regions Ps. Each of the light emission layers 80 emits any one of colors, i.e., red (R), blue (B), and green (G). The display device X2 employs the EL display panel, and thus is not provided with the light source device 40, the first polarization plate 60, and the second polarization plate 70.

The display device X2 has the light emission layers 80 each emitting any one of the colors, i.e., red (R), blue (B), and green (G). Alternatively, the light emission layers 80 emitting white lights and the color filters 14 may be provided therewith.

In the display device X2, an external drive circuit controls light emissions of the light emission layers 80 via the first display electrodes 161 and the second display electrodes 211. When the lights emitted by the light emission layers 80 pass through the first substrate 10, an image can be displayed in the display region $E_I$ of the display device X2.

In the display device X2 according to the second embodiment, at the crossing portions of the second connection electrodes 122 and the first connection electrodes 112, the light shielding patterns 14 demarcating the display regions $E_I$ are interposed between the second connection electrodes 122 and the first connection electrodes 112, thereby achieving the same effect as the afore-mentioned first embodiment, i.e., reduction in the number of components.

Third Embodiment

Figure 12:
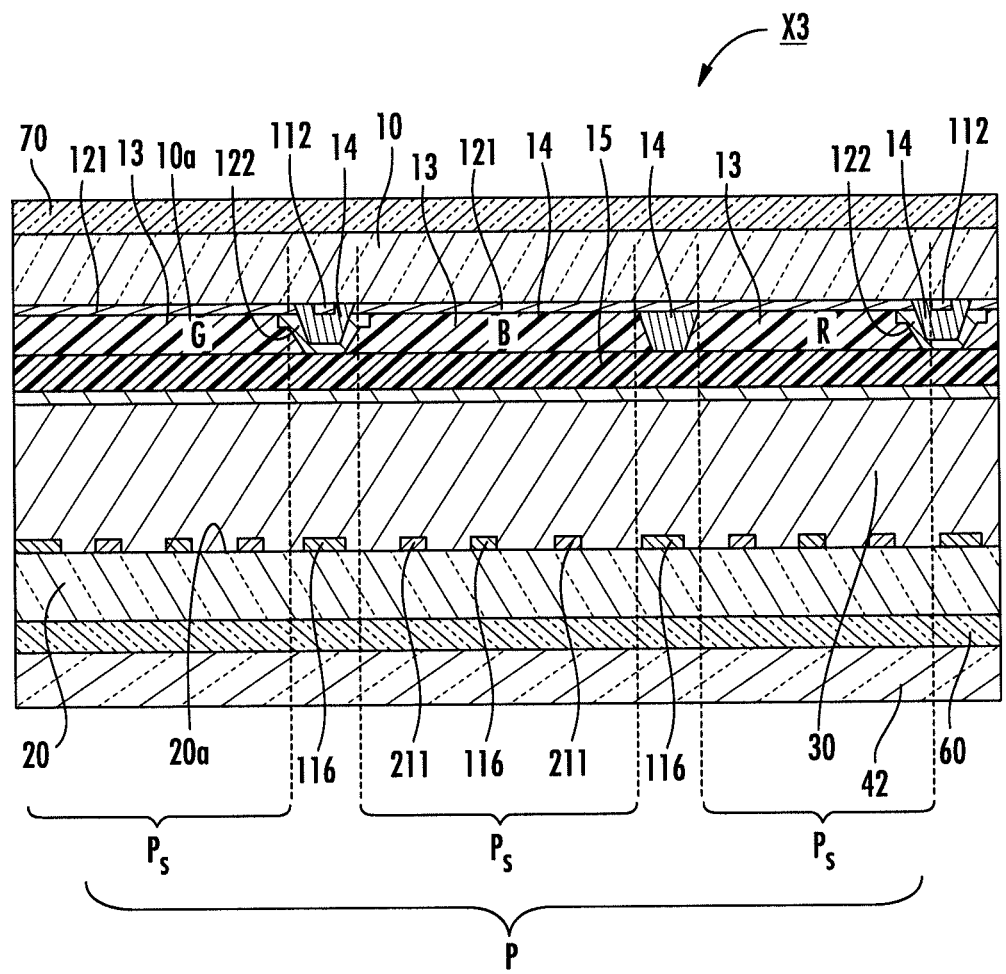
FIG. 12 is a cross sectional view illustrating an essential portion of a display device according to a third embodiment of the present invention.

Subsequently, a display device X3 according to a third embodiment of the present invention is explained with reference to FIG. 12. Elements having the same functions as those of the display device X1 are denoted with the same reference numerals, and the same explanations as the explanations about the display device X1 are basically omitted.

The display device X3 is different from the display device X1 as follows. In the display device X1, a vertical electric field-type and a passive-matrix type liquid crystal display device is employed. In contrast, in the display device X3, a horizontal electric field-type and an active-matrix type liquid crystal display device is employed.

More specifically, in the display device X1, the first display electrodes 161 are arranged on the first main surface 10a of the first substrate 10, and the second display electrodes 211 are arranged on the facing surface 20a of the second substrate 20. In contrast, in the display device X3, the first display electrodes 161 and the second display electrodes 211 are arranged on the facing surface 20a of the second substrate 20.

In the display device X3, the first display electrodes 161 and the second display electrodes 162 arranged on the facing surface 20a of the second substrate 20 form an electric field to control the liquid crystal layer 30. This electric field is formed in a horizontal direction. Accordingly, the electric field formed by the first display electrodes 161 and the second display electrodes 162 is less likely to reach the first detection electrodes 111 and the second detection electrodes 121 formed on the first main surface 10a of the first substrate 10. Therefore, a noise generated in the first detection electrodes 111 and the second detection electrodes 121 can be reduced, and a decrease in detection accuracy can be reduced.

In the display device X3, a so-called IPS (In-Plane Switching) mode has been described. Instead, an FFS (Fringe Field Switching) mode may be employed.

In the afore-mentioned embodiments, specific examples of embodiments of the present invention are shown, and various changes can be made without deviating from the gist of the present invention.

In the first and second embodiments, passive matrix type liquid crystal display is employed. Alternatively, active matrix type liquid crystal display may be employed.

In the second embodiment, the second substrate 20 is arranged, but the second substrate 20 is not necessarily required. For example, the light emitting layer 80 and the second display electrodes 211 may be arranged on the first substrate 10.

The display method using the liquid crystal layer 30 has been described in the first embodiment. The display method using the light emission layers 80 has been described in the second embodiment. However, the display method is not limited thereto. For example, a display method using plasma may be used. In this case, the first connection electrodes 112 and the second connection electrodes 122 of the touch panel cross each other and have the light shielding pattern 14 or the color filters 13 serving as a demarcating pattern in the display region E$_I$ of the plasma display device therebetween. Accordingly, the same effects as those of the display device according to the present embodiment can be obtained.

The display device according to one of the first to third embodiments may be applied to electronic paper.

What is claimed is:

1. A display device comprising:
   a first substrate comprising a first main surface;
   a plurality of color filters disposed on the first main surface;
   a light shielding pattern disposed between two of the color filters on the first main surface;
   a plurality of first detection electrodes disposed on the first main surface;
   a plurality of second detection electrodes disposed on the first main surface;
   a plurality of first connection electrodes disposed on the first main surface, each of the first connection electrodes connecting two of the first detection electrodes adjacent to each other; and
   a plurality of second connection electrodes disposed on the first connection electrodes wherein either the color filter or the light shielding pattern are disposed between the first connection electrodes and the second connection electrodes, each of the second connection electrodes connecting the second detection electrodes adjacent to each other.

2. The display device according to claim 1, further comprising:
   a second substrate comprising a main surface facing the first main surface of the first substrate;
   a liquid crystal layer disposed between the first substrate and the second substrate;
   a first display electrode that applies a voltage to the liquid crystal layer; and
   a second display electrode that applies a voltage to the liquid crystal layer.

3. The display device according to claim 2, wherein
   the first display electrode is disposed on the first main surface of the first substrate; and
   the second display electrode is disposed on the main surface of the second substrate.

4. The display device according to claim 2, wherein
   the first display electrode and the second display electrode are disposed on the first main surface of the first substrate or the main surface of the second substrate.

5. The display device according to claim 1, wherein
   the light shielding pattern is disposed between the first connection electrodes and the second connection electrodes.

6. The display device according to claim 5, wherein the first detection electrodes, the first connection electrodes, the second detection electrodes and the second connection electrodes are within the light shielding pattern in a plan view.

7. The display device according to claim 1, wherein
   the color filters are disposed between the first connection electrodes and the second connection electrodes.

8. The display device according to claim 1, wherein the second connection electrode has a thickness larger than the second detection electrode has.

9. The display device according to claim 1, further comprising:
   a first detection conductive line that applies a voltage to the first detection electrodes, which is on the first main surface of the first substrate and outside of the plurality of color filters in a plan view;
   a second detection conductive line that applies a voltage to the second detection electrodes, which is on the first main surface of the first substrate and outside of the plurality of color filters in a plan view;
   a first display conductive line that applies a voltage to the first display electrodes, which is on the first main surface of the first substrate and outside of the plurality of color filters in a plan view; and
   a second display conductive line that applies a voltage to the second display electrodes, which is on the first main surface of the first substrate and outside of the plurality of color filters in a plan view; wherein
   the first detection conductive line, the second detection conductive line, the first display conductive line, and the second display conductive line comprise the same material as the second connection electrode.

10. The display device according to claim 1, wherein the plurality of color filters and the light shielding pattern are disposed on the plurality of first detection electrodes, the plurality of second detection electrodes, and the plurality of first connection electrodes.

11. A display device comprising:
    a display region including a plurality of pixel regions;
    a first substrate having a first main surface;
    a light shielding pattern along the circumference of the pixel regions disposed on the first main surface;
    a plurality of first detection electrodes disposed on the first main surface;
    a plurality of second detection electrodes disposed on the first main surface;
    a plurality of first connection electrodes disposed on the first main surface, each of the first connection electrodes connecting the first detection electrodes adjacent to each other;
    a plurality of second connection electrodes disposed on the first connection electrodes, wherein the light shielding pattern is disposed between the first connection electrodes and the second connection electrodes, each of the second connection electrodes connecting the second detection electrodes adjacent to each other;
    a plurality of first display electrodes on the first main surface of the first substrate, each of the first display electrodes in each of the pixel regions;
    a plurality of second display electrodes facing the first display electrodes; and
    a plurality of light emitting layers disposed between the first display electrodes and the second display electrodes.

* * * * *